United States Patent [19]

Hopwood

[11] Patent Number: 4,887,350
[45] Date of Patent: Dec. 19, 1989

[54] HANDLING APPARATUS AND METHODS

[75] Inventor: Robert T. Hopwood, Cheltenham, United Kingdom

[73] Assignee: DRG (UK) Limited, Bristol, England

[21] Appl. No.: 235,871

[22] PCT Filed: Jan. 15, 1988

[86] PCT No.: PCT/GB88/00026
§ 371 Date: Aug. 16, 1988
§ 102(e) Date: Aug. 16, 1988

[87] PCT Pub. No.: WO88/05608
PCT Pub. Date: Jul. 28, 1988

[30] Foreign Application Priority Data

Jan. 16, 1987 [GB] United Kingdom ............... 8700906

[51] Int. Cl.⁴ .......................... B23P 19/00; B25B 1/04
[52] U.S. Cl. ..................................... 29/730; 29/623.1; 269/238
[58] Field of Search ............... 29/730, 623.1; 269/129, 269/228, 229, 237, 238

[56] References Cited

U.S. PATENT DOCUMENTS 2,807,873 10/1957 Weissenberger .................... 269/229
4,361,326 11/1982 Golz et al. ............................ 29/730
4,509,252 4/1985 Sabatino et al. ................... 29/623.1
4,537,389 8/1985 Kancnik et al. ..................... 269/238
4,660,816 4/1987 Taylor ................................. 269/238

FOREIGN PATENT DOCUMENTS 0071279 6/1981 Japan .................................. 29/623.1

Primary Examiner—Donald L. Walton
Attorney, Agent, or Firm—Young & Thompson

[57] ABSTRACT

This invention relates to handling apparatus and methods and in particular, but not exclusively, to the handling of groups of battery plates.

Thus handling apparatus 10 includes a main upright 11 supporting a transport mechanism 12 from which depends a plurality of spaced gripping devices 13. These devices are used to remove groups of battery plates from a jig box 14 to hold the plates in their alignment while moving them to a position 17 where they can be loaded in to the cells 18 of a battery box 19. A guide 21 is provided for providing the plates in to the cells 18. The loading procedure is carried out in two stages, a first set of cells being loaded in the first operation and a second set in the second operation.

23 Claims, 5 Drawing Sheets

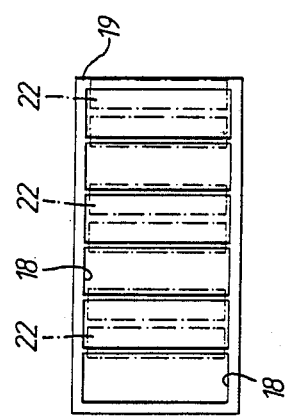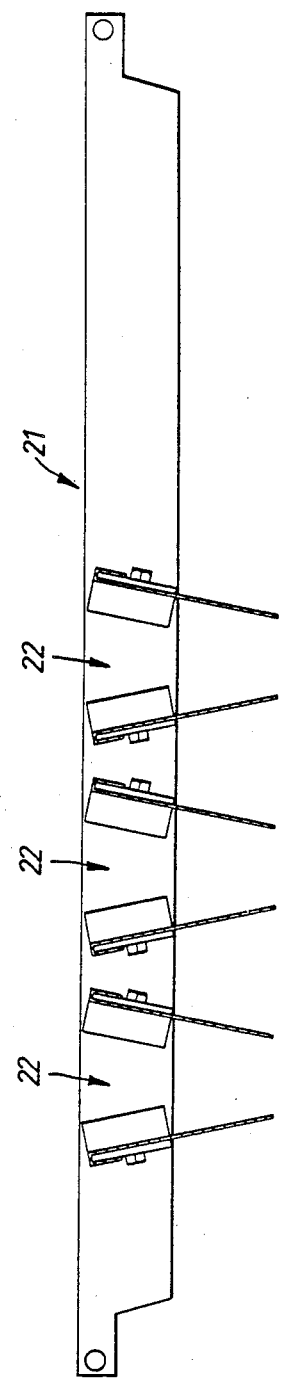

HANDLING APPARATUS AND METHODS

This invention relates to handling apparatus and methods and in particular, but not exclusively, to the handling of groups of battery plates.

In the automatic or semi-automatic manufacture of batteries it is usual to have to handle stacks or groups of battery plates at various stages. For example, they may need to be loaded into a casting machine and subsequently out of that machine into the cells of a battery box. The quality and speed of production of the batteries is to a great extent dependent on accuracy of the alignment of the plates in the stack.

Attempts to automate these handling operations have, for the most part, foundered because of a tendency of the plates to spread at their lower edge when gripped or because of the limited space between the groups.

This invention relates to a method of handling battery plate groups or the like, comprising mechanically gripping the groups whilst they are retained in a pre-determined alignment, releasing the groups from that retainment, transporting the groups in their mechanically gripped state to a multi-compartment holder, loading respective groups into a first set of non-adjacent compartments in the holder and then releasing them and loading respective groups into a second set of non-adjacent compartments and then releasing them.

Conveniently the compartments in the first and second sets are alternate.

The method may further comprise inserting a guide into each compartment before loading and for example there may be a plurality of guides, in the form of chutes, which are first presented to the first set of compartments and then to the second set.

In a loading operation the groups may be initially retained in cassettes and loaded into a multi-compartment carrier of a casting machine; the compartments being defined by partition plates or separators in the carrier. In an unloading operation the groups may be retained in the carrier and unloaded into the compartments or cells of a battery box.

From another aspect the invention consists in apparatus for handling battery plate groups or the like, comprising a plurality of side-by-side gripping devices for gripping respective groups when held in retaining means, means for moving the gripping devices from the retaining means to a multi-compartment holder loading position, means for relatively moving a first set of gripping devices and the holder to position groups in non-adjacent compartments in the holder, means for releasing the first set of gripping devices, means for relatively moving a second set of gripping devices and the holder to position groups in a second set of non-adjacent compartments and means for releasing the second set of gripping devices.

The apparatus may further include guide means insertable in the compartments for guiding the groups into the compartments as their respective gripping devices are lowered. For example, the guide means comprise a plurality of spaced chutes positioned for insertion in non-adjacent compartments of the holder. Means may be provided for inserting the chutes initially in the first-mentioned set of compartments and subsequently in the second set of compartments. Conveniently the compartments in the first and second sets are alternate.

The apparatus may further include means for adjusting the spacing between the gripping devices to allow for different relative group positions in the retaining means and the holder. Thus, the gripping devices may be mounted for relative sliding movement in the sense to vary their spacing and the spacing adjustment means may comprise means for camming the gripping devices apart and together as they pass from the retaining means position to the holder position and back again.

In any of the above cases the gripping devices may comprise a pair of spaced gripping elements hingingly projecting from a support, a toggle extending between the gripping element, and means for opening and closing the toggle to open and close the elements.

The opening and closing means may comprise a fluid-activated ram located between the elements and the gripping elements may include flexible sheet material gripping portions The elements may be connected to the support by leaf springs.

As mentioned previously, in a loading operation, the retaining means may be cassettes containing groups of battery plates and the holder may be a carrier, for example on a casting machine. In an unloading operation the retaining means may be a carrier and the holder and battery box.

For the purpose of this specification, the term "battery plate groups or the like" covers any similar stack or grouping of essentially sheet elements.

From another aspect the invention consists in a gripping device comprising a pair of spaced gripping elements hingingly projecting from a support, a toggle extending between the gripping elements and means for opening and closing the toggle to open and close the elements.

The other features of the gripping device may be as set out above.

The invention may be performed in various ways and specific embodiments will now be described, by way of example, with reference to the accompanying drawings, in which:

FIG. 2a is a view from above of the battery box including a guide and FIG. 2b is a longitudinal sectional view of the guide along the line II—II;

Figure 1:
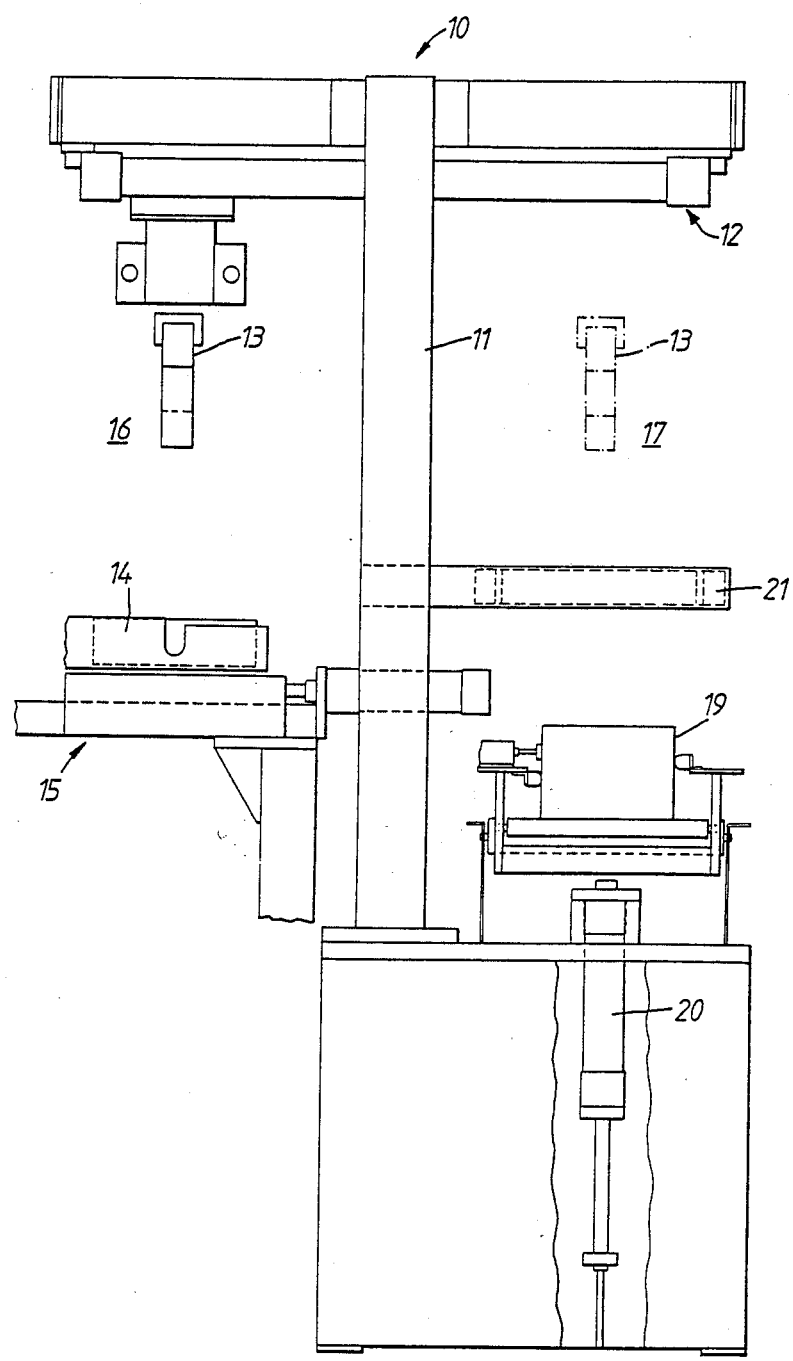
FIG. 1 is a side, part-schematic view of the handling apparatus set up to unload the battery groups from a casting machine carrier, or jig box into a battery box.
Figure 4:
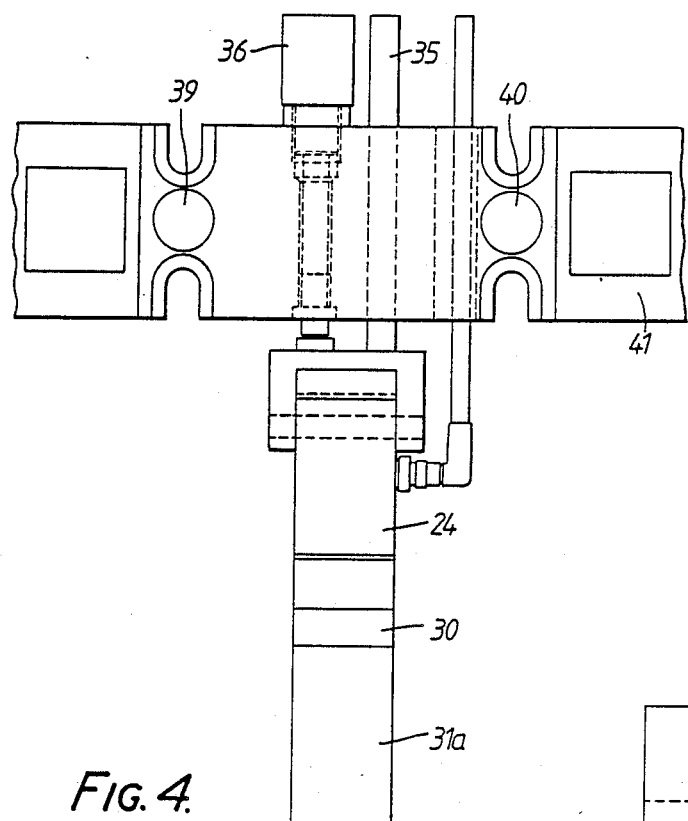
Figure 5:
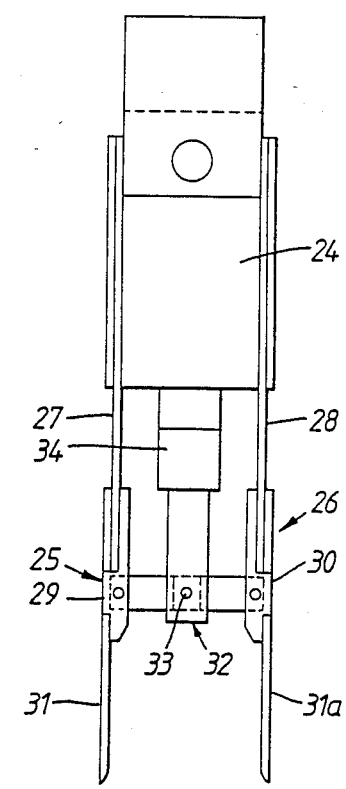
Figure 6:
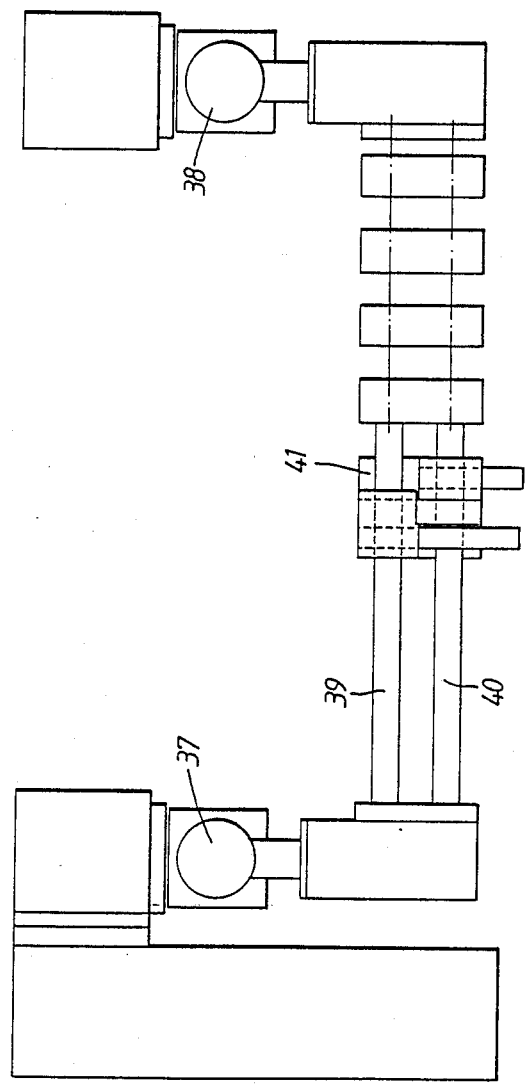
Figure 7:
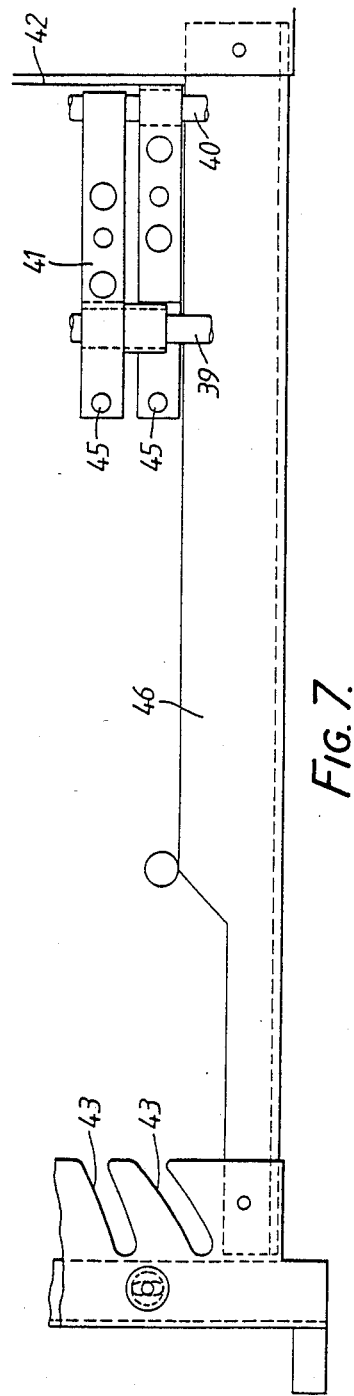

FIG. 3a to h illustrate the various stages in the operation of the handling apparatus for FIG. 1;

FIG. 4 is a side view of a gripping device of the handling apparatus showing part of its support system;

FIG. 5 is an end view of the gripping device of FIG. 4;

FIG. 6 is a schematic end view of part of the transport system of the handling device of FIG. 1; and FIG. 7 is a scrap view from above of a part of that transport mechanism.

The invention will now be described in the context of unloading groups of battery plates from a carrier or jig box on a casting machine and loading them into a battery. However, as has been indicated above, many of the principles involved are more generally applicable.

Referring to FIG. 1 a handling apparatus, generally indicated at 10, includes a main upright 11 supporting a transport mechanism 12 from which depend a plurality of spaced gripping devices 13, the end one of which is schematically illustrated in FIG. 1.

The construction and movement mechanisms of the gripping devices 13 will be described in more detail below, but the general operation is as follows. After a casting operation a jig box 14 arrives at an unloading station 15 and is turned over to present the upper edges of groups of battery plates to the gripping devices 13. The devices 13 are lowered into the jig box 14 to lie along the side faces of their respective battery groups engaging those faces through cut-out portions in partition walls of the jig box 14. The devices 13 are then activated to grip the groups and subsequently the groups are released from the carrier so that they are only held by the gripping devices. The gripping devices 13 are then raised by the handling apparatus 10 into position 16, shown in FIG. 1, and then moved sideways into position 17 by the transport mechanism 12. As the spacing of the groups in the carrier or jig box 14 is much greater than the spacing of the cells 18 of the battery box 19 into which it is intended to load the groups, the spacing between the gripping devices 13 and hence the groups is reduced during the sideways movement.

Once the groups are positioned above the battery box 19, the box 19 is raised by a pneumatic ram 20 until it lies adjacent a guide 21. This guide 21 has three spaced chutes 22 which initially engage in alternate cells 18 of the battery box 19 (see FIG. 2a). Alternate gripping devices 13 which are aligned with the chutes 22, are then lowered so that the groups are introduced into their respective cells 18 through the guide chutes 22. The provision of these chutes overcomes any tendency of the group to spread at its lower edge during lowering. The located groups are then released by their gripping devices and those devices are withdrawn. The guide chutes 22 are then moved sidewardly to engage in the alternate empty cells and the process repeated with the remaining gripping devices 13. (The box 19 is lowered and then raised to allow for this movement of the guide chutes). As soon as this operation is completed the gripping devices are returned to position 16 and in the process their spacing opened out to correspond to that of the groups in the next carrier 14 delivered to the unloading station 15.

It will be noted that throughout the operation the battery plates are held securely so that the alignment pre-set by the jig box 14 is maintained right into the battery cells 18.

As can be seen in FIG. 2a, the loading of alternate groups enables the chutes to overlie the cells, which are not filled in that operation, and so they can be dimensioned to be sure of engaging the groups as they are lowered.

Figure 3A:
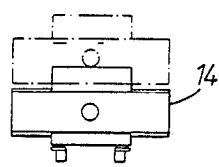
Figure 3B:
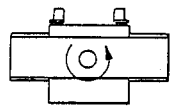
Figure 3F:
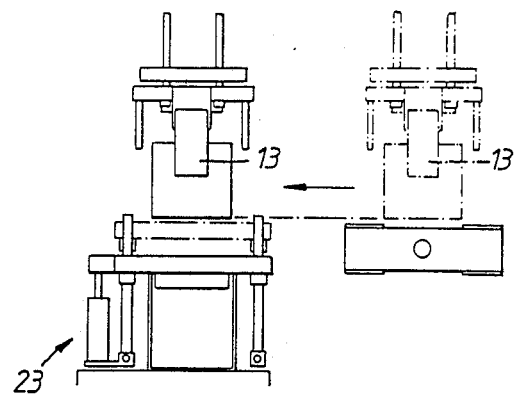
Figure 3C:
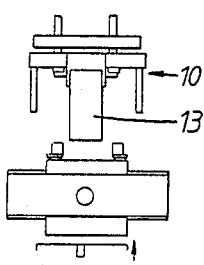
Figure 3D:
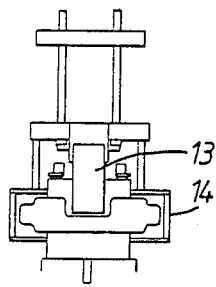
Figure 3G:
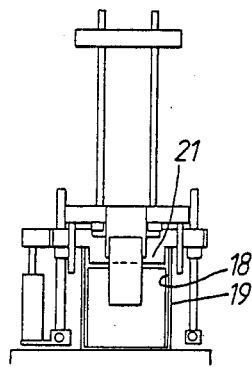
Figure 3E:
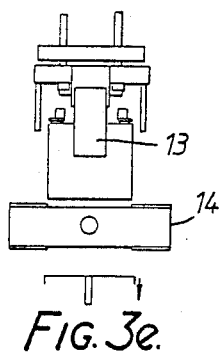

The complete cycle is illustrated in FIGS. 3a to h as is the guide operating mechanism here designated 23. Thus:

FIG. 3a shows a jig box 14 on a casting machine being moved to an unloading station 15 and being lowered on to a turning mechanism 50;

FIG. 3b shows the jig box being rotated to position the groups with their terminals 51 upwards;

FIG. 3c shows the handling apparatus 10 with the gripping devices 13 being moved to the unloaded position whilst having their spacing adjusted;

FIG. 3d shows the gripping devices 13 being lowered to grip the groups and when this has happened the jig box 14 unclamps;

FIG. 3e illustrates the gripping devices 13 lifting the groups out of the jig box 14 while it is simultaneously lowered;

FIG. 3f indicates the movement of the gripping devices 13 from the unload station 15 to the boxing station;

FIG. 3g shows the loading phase in which the guide 21 is located in the first set of cells or compartments 18, three gripping heads 13 descend to load these compartments 18 and then ascend, the guide 21 is lifted from the battery box 19 and is indexed along one cell, before the guide is lowered again and the second set of compartments filled.

Figure 3H:
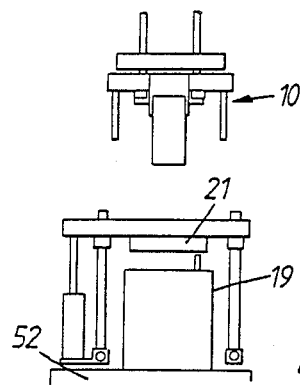

And in FIG. 3h the handling apparatus 10 returns to the unloading station, the guide 21 lifts and away from the box 19 which is moved along the conveyor 52 to allow the next box to enter the station.

Turning to FIGS. 4 and 5, each gripping device 13 comprises a main body or support 24 to which are attached two gripping elements 25, 26 by means of respective leaf hinges 27, 28. The gripping elements 25, 26 comprise an enlarged upper portion 29, 30 and a flexible gripping plate 31, 31a. The upper portions 29, 30 are interconnected by a toggle 32 which in its straight line position, as illustrated in FIG. 4, holds the gripping plates 31, 31a apart, but which brings them together into a gripping position when the central pivot 33 of the toggle 32 is lowered by hydraulic ram 34 carried on the main body 24. It will be noted that the gripping devices 13 is both powerful and slim making it particularly suitable for handling stacks of plates in confined locations.

The gripping devices are mounted for vertical movement on elongate rods 35, the movement being achieved by individual pneumatic rams 36. Simultaneously, they are carried for sideways movement between two rodless cylinders 37, 38 (see FIG. 6) on laterally extending rods 39, 40 by means of mounting blocks 41. The minimum separation of these blocks 41 is determined by spacer elements 42 whilst the maximum separation is dictated by a series of finger-like cam paths 43 on a plate 44 extending across the transport mechanism 12. These cam paths 43 capture pins 45 on the blocks 41 as the gripping devices 13 are moved over the carrier or jig box 14, the movement being guided by at least a pair of profile guide plates 46. It will be understood that the particular spacings taken up by the gripping devices 13 can be readily altered by changing the spacer elements 42 and the cam path plate 44 so that the machine can be quickly adapted to varying dimensions of groups and battery boxes.

Where very small battery boxes are being loaded it may be necessary to index the box between loading operations because the separation of the cells 18 is less than the minimum separation of the gripping devices 13. The groups may be delivered by adjacent gripping devices if the box is indexed.

What we claim is:

1. A method of handling battery plate groups or the like, comprising mechanically gripping a set of groups whilst they are retained in a predetermined alignment, releasing the set of groups from that retainment, transporting the set of groups in the mechanically gripped state to a multi-compartment holder, loading respective groups from the set into a first set of non-adjacent compartments in the holder and then releasing them and loading further respective groups into a second set of non-adjacent compartment and then releasing them.

2. A method of handling a set of battery plate groups comprising mechanically gripping a set of groups whilst the groups are maintained in a predetermined alignment and spacing, releasing the set of groups from that retainment, transporting the set of groups in their mechanically gripped state to a position adjacent a multi-compartment holder, adjusting the spacing of the groups to correspond with the spacing of the compartments, loading respective groups from the set into a first set of non-adjacent compartments in the holder and loading further respective groups into a second set of non-adjacent compartments and then releasing them.

3. A method of handling as claimed in claim 2, wherein the spacing is adjusted during the step of transporting.

4. A method of handling as claimed in claim 2, wherein the compartments in the first and second sets are alternate.

5. A method as claimed in claim 2, further comprising inserting a guide into each compartment before loading.

6. A method as claimed in claim 5, wherein there are a plurality of guides.

7. A method as claimed in claim 6, wherein the guides are first presented to the first set of compartments and then to the second set.

8. A method as claimed in claim 7, wherein the holder is moved relative to the gripping devices after the first set have been filled.

9. A method as claimed in claim 5, wherein the guide is a chute.

10. Apparatus for handling a set of battery plate groups or the like, comprising a plurality of side-by-side gripping devices for gripping respective groups of a set when the set is held in retaining means, means for moving the gripping devices from the retaining means to a multi-compartment holder loading position, means for relatively moving a first set of gripping devices and the holder position to position groups in non-adjacent compartments in the holder, means for releasing the first set of gripping devices, means for relatively moving a second set of gripping devices and the holder position to position groups in a second set of non-adjacent compartments in the holder and means for releasing the second set of gripping devices.

11. Apparatus for handling a set of battery plate groups, comprising a plurality of side-by-side gripping devices for gripping respective groups of the set when the set is held in retaining means with the groups in a predetermined alignment and spacing, means for moving the gripping devices from the retaining means to a multi-compartment holder loading position, means for adjusting the spacing of the groups to correspond with the spacing of the compartments in the holder, means for relatively moving a first set of gripping devices and the holder position to position groups in non-adjacent compartments in the holder, means for releasing the first set of gripping devices, means for relatively moving a second set of gripping devices and the holder position groups in a second set of non-adjacent compartments in the holder and means for releasing the second set of gripping devices.

12. Apparatus as claimed in claim 11, wherein the spacing adjustment means adjusts the spacing as the gripping devices are moved from the retaining means to the loading position.

13. Apparatus as claimed in claim 12, wherein the compartments in the first and second sets are alternate.

14. Apparatus as claimed in claim 13, further comprising guide means insertable in the compartment for guiding the groups into the compartments as their respective gripping devices are lowered.

15. Apparatus as claimed in claim 14, wherein the guide means comprise a plurality of spaced chutes positioned for insertion in non-adjacent compartments of the holder.

16. Apparatus as claimed in claim 15, further including means for relatively moving the guide means and the holder to insert the chutes initially in the first set of compartments and subsequently in the second set of compartments.

17. Apparatus as claimed in claim 11, wherein the gripping devices are mounted for relative sliding movement in a sense to vary their spacing and wherein the spacing adjustment means comprise means for camming the gripping devices apart and together as as they pass from the retaining means position to the holder position and back again.

18. Apparatus as claimed in claim 10 or claim 11, wherein a gripping device comprises a pair of spaced gripping elements hingingly projecting from a support, a toggle extending between the gripping elements, and means for opening and closing the toggle to open and close the elements.

19. Apparatus as claimed in claim 18, wherein the opening and closing means comprise a fluid-activated ram.

20. Apparatus as claimed in claim 18, wherein the gripping elements include flexible sheet material gripping portions.

21. Apparatus as claimed in claim 18, wherein the elements are connected to the support by leaf springs.

22. A gripping device comprising a support, a pair of rigid elements, a pair of leaf springs, each hingingly connecting a respective rigid element to the support to hold the rigid elements in positions spaced one from the other, a flexible sheet material gripping element attached to each rigid element and extending away from the associated leaf spring toggle extending between the gripping elements and means for opening and closing the toggle to in a sense open and close the gripping elements.

23. A device as claimed in claim 22, wherein the opening and closing means comprise a fluid-activated ram.

* * * * *